United States Patent Office 3,394,266
Patented July 23, 1968

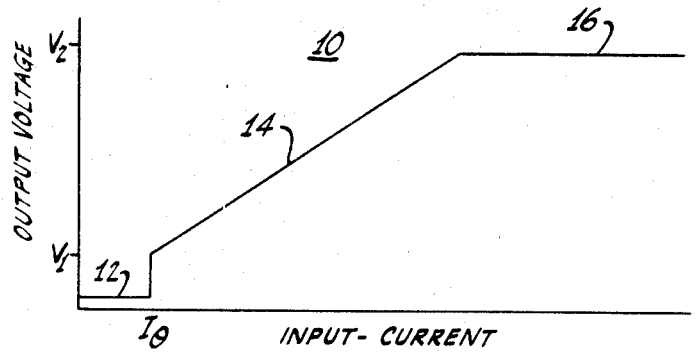
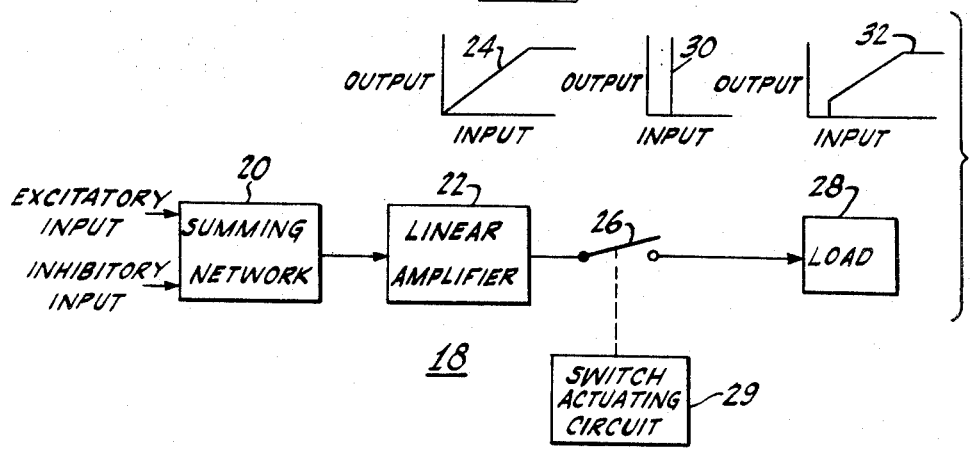
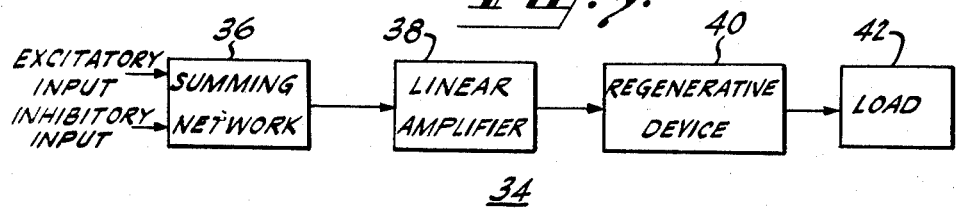

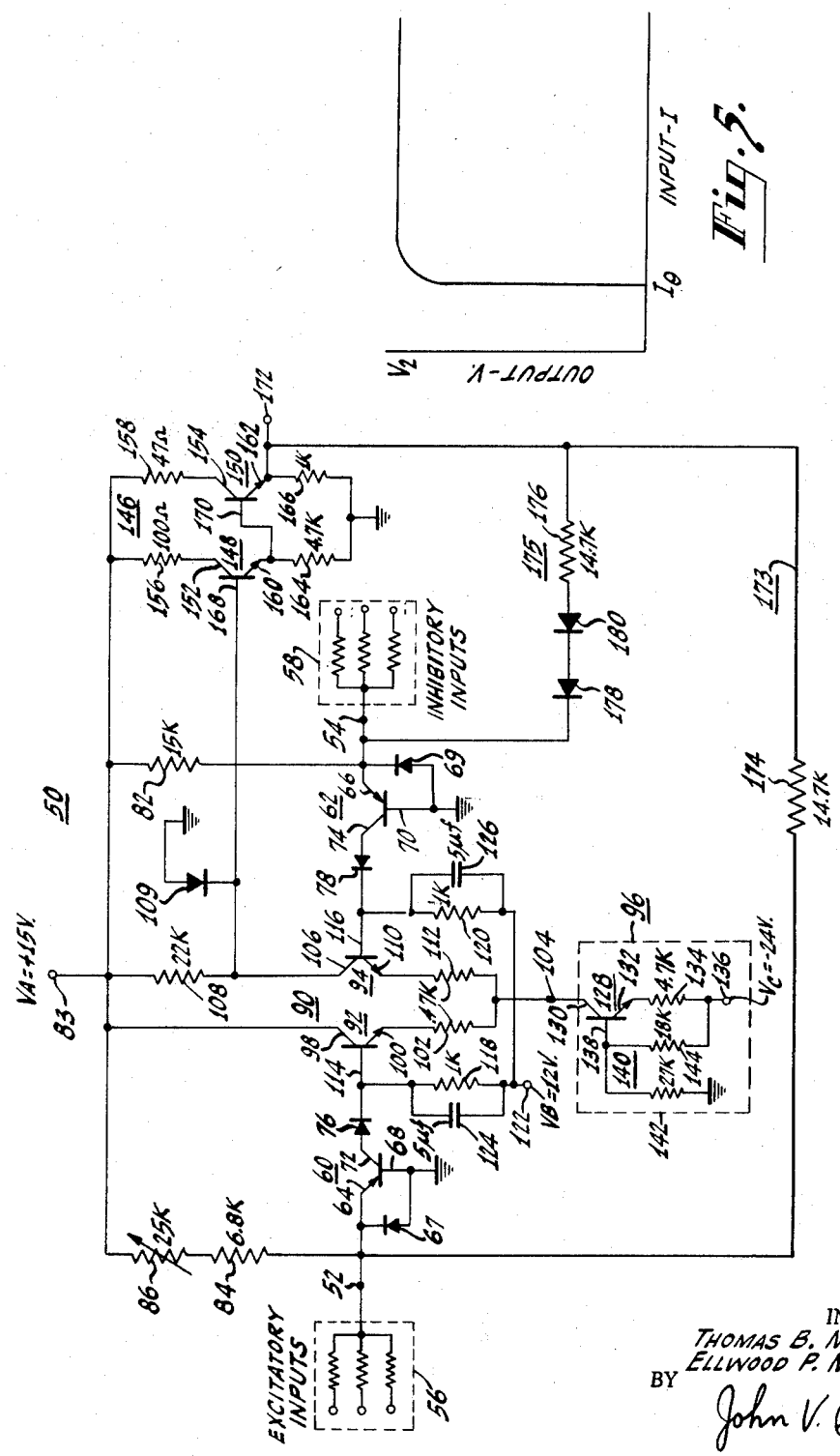

3,394,266
DIRECT CURRENT ELECTRICAL NEURON CIRCUIT
Thomas B. Martin, Riverside, and Ellwood P. McGrogan, Jr., Haddonfield, N.J., assignors to Radio Corporation of America, a corporation of Delaware
Filed Oct. 27, 1964, Ser. No. 406,681
10 Claims. (Cl. 307—201)

ABSTRACT OF THE DISCLOSURE

A direct current (pulseless) electrical neuron circuit comprises a threshold circuit that includes an amplifier which linearly amplifies direct current excitatory input signals when these signals exceed direct current inhibitory signals by a predetermined threshold value. An initial digital step is introduced into the output signals at the threshold point by providing an immediate regenerative feedback of the output signals to the excitatory input terminals of the neuron. The height of the digital step is limited to a predetermined value by providing a delayed feedback of the output signals to the inhibitory input a delayed feedback of the output signals to the inhibitory input terminals of the neuron. The delayed feedback is effectively degenerative, since it is applied to the inhibitory input terminals. The delayed feedback counterbalances the immediate feedback since the same output signals are fed back to both the excitatory and the inhibitory input terminals. Thus the feedback to the excitatory input terminals is effectively cancelled after the initial digital step and the difference amplifier then amplifies increasing excitatory input signals in a linear analog manner up to a maximum saturation point, at which point the output becomes constant.

---

The basic building blocks of the biological nervous system are neurons. Biological neurons receive stimuli in the form of electrical input pulses from other biological neurons or from receptor sense organs, such as the ear, etc., and respond to certain stimuli by generating electrical output pulses by means of a complex electrochemical process.

Biological neurons receive both excitatory and inhibitory input pulses of standard width and amplitude. Excitatory input pulses tend to activate a biological neuron whereas inhibitory input pulses tend to inhibit the excitation of a neuron. It is believed that the excitatory and inhibitory input pulses are algebraically added together and that the sums of the two types of pulses are then integrated to provide a resultant pulseless or direct input signal to the biological neuron. When such a resultant input signal exceeds a predetermined threshold value, the biological neuron is activated or is "fired" and produces a pulse output. The number of firings or output pulses produced is a function of the intensity of the direct input signal as well as the characteristics of the biological neuron itself. The number of firings in a given time interval increases as the intensity of the input signal increases up to a maximum or saturation point after which the firing rate remains constant. Saturation point after which the firing rate remains constant. Saturation occurs because the electrochemical processes producing the pulses require a refractory period, i.e., a recuperative period, between pulses.

The paths interconnecting biological neurons in the human body sometimes exhibit extremely high impedances—higher than $10^{13}$ ohms in some instances. It is believed that biological neurons transmit different stimuli, i.e., information signals, by pulses of differing frequencies so as to avoid the difficulty of having to accurately transmit small amplitude direct signals over such high impedance paths. Electrical circuits designed to simulate the operation of biological neurons need not be interconnected by such high impedance paths. Consequently, such electrical neurons need not produce a pulse output to transmit desired information to succeeding electrical neurons. Additionally, since integration occurs at the input to a biological neuron, an individual biological neuron effectively responds to a direct current input signal rather than a pulse input signal. Therefore, electrical neurons can effectively simulate the important functions of biological neurons without utilizing either input or output pulses.

Accordingly, it is an object of this invention to provide an electrical threshold circuit which inexpensively and reliably simulates the desired functions of a biological neuron.

It is another object of this invention to provide a pulseless electrical neuron which effectively simulates a biological neuron.

It is another object of this invention to provide a new and improved threshold circuit which exhibits both digital and analog operating characteristics.

It is another object of this invention to provide an electrical circuit which receives direct current level inputs and produces a direct current level output which substantially duplicates the transfer characteristic of a biological neuron.

In accordance with the invention, a threshold logic circuit simulates a biological neuron by exhibiting an input-output characteristic which includes a region of substantially zero output for low values of input signals below a predetermined threshold value; an abrupt digital step increase in output to a first value at said threshold point; a region of analog increase in output from said first value to a saturation value for intermediate values of input signals; and a region of substantially constant output at said saturation value for high values of input signals.

The threshold circuit effectively includes a summing network for algebraically adding direct current excitatory and inhibitory input signals and an amplifier which is coupled to the summing network to receive an input when the excitatory signals exceed the inhibitory signals. The amplifier produces an output which increases for an increasing input up to a saturation point at which point the output remains substantially constant for further increases in input. A bistable switch is coupled to the output of the amplifier to prevent the transmission of the amplifier output until the switch is actuated. The bistable switch therefore provides the threshold function for the logic circuit and causes the output to begin at a first value and increase up to the saturation value for increasing input signals. The bistable switch may, for example, comprise a regenerative device, such as a negative resistance device, which is suitably biased to switch abruptly from a low output to a higher output when the amplifier output exceeds a predetermined threshold value.

In one specific embodiment constructed in accordance with the invention, a difference amplifier is included in the threshold logic circuit. The difference amplifier includes a pair of active circuit elements, such as transistors, which are coupled to receive excitatory and inhibitory input signal levels, respectively. A threshold value is established by biasing the excitatory transistor to receive less bias current than the inhibitory transistor. The difference amplifier amplifies the difference between the two sets of signals when the excitatory signals exceed the inhibitory signals by at least the threshold value. The output of the difference amplifier is separately and regeneratively fed back to the excitatory and inhibitory inputs of the amplifier.

The feedback path to the inhibitory input, but not to the excitatory input, of the difference amplifier includes nonlinear impedances or threshold switching devices, such as diodes. The nonlinear impedances effectively block any feedback to the inhibitory input for low values of output signals. Thus, the output signal produced at the predetermined threshold point is regeneratively fed back only to the excitatory input of the difference amplifier to cause an abrupt step increase in the output of the amplifier. When the output reaches the threshold point of the nonlinear devices, regenerative feedback is also provided to the inhibitory input as well as to the excitatory input. The two feedback signals effectively cancel each other in the difference amplifier and the amplifier operates as if there were no feedback at all. The difference amplifier amplifies increasing excitatory inputs until saturation occurs, at which point the output remains substantially constant regardless of further increases in input.

In the drawing:

FIGURE 1 is the current-voltage characteristic of an electrical circuit which simulates a biological neuron;

FIGURES 2 and 3 are block diagrams of threshold circuits which exhibit the characteristic of FIGURE 1;

FIGURE 4 is a schematic circuit diagram of a threshold circuit which simulates a biological neuron; and, FIGURE 5 is the input-output characteristic of the difference amplifier in the circuit of FIGURE 4 with excitatory feedback.

Referring now to FIGURE 1, there is illustrated a graph showing the input-output characteristic 10 of a threshold circuit in accordance with the invention. The characteristic curve 10 of FIGURE 1 substantially duplicates the transfer characteristic of a biological neuron. The characteristic curve 10 exhibits a region 12 of substantially zero output voltage for low values of input current below a threshold point $I_0$. At the threshold point $I_0$, the characteristic curve exhibits an abrupt or discrete step increase in output voltage up to a first output voltage value $V_1$. Thus, the curve 10 exhibits digital characteristics in that below the threshold point $I_0$ substantially no output is produced whereas at this point a significant output voltage is produced. Such an abrupt increase reduces the chances of noise or drift triggering an electrical neuron, and permits biological neurons to ignore inconsequential stimuli. The curve 10 exhibits a region 14 of continuous or analog increase in output voltage for increasing intermediate values of input current. Although FIGURE 1 shows a linear analog increase, because the threshold circuit to be described includes a linear amplifier, it is to be noted that the increase in the analog portion 14 may also be logarithmic. The output voltage in the portion 14 increases up to a saturation point or maximum voltage level $V_2$ after which the curve 10 exhibits a substantially constant output voltage region 16 for relatively high and increasing values of input current. The characteristic curve 10 substantially duplicates the functional transfer characteristic of biological neurons.

In FIGURE 2 there is shown a block diagram of one electrical circuit which exhibits a replica of the characteristic curve 10. The simulated neuron 18 of FIGURE 2 includes a summing network 20 which algebraically adds excitatory and inhibitory input signals to produce a resultant D.C. level input signal to a linear amplifier 22. The linear amplifier 22 exhibits an input-output characteristic similar to the characteristic 24 in FIGURE 2. The characteristic 24 begins at the origin and increases linearly up to a saturation point, after which point the output remains substantially constant. The output of the amplifier 22 is coupled through a bistable switching circuit, shown in FIGURE 2 as a single-pole, single-throw switch 26, to a load 28. The bistable switch 26 exhibits an input voltage-output current characteristic 30 which includes an initial region of infinite impedance when the switch 26 is open and a region of zero impedance when the switch 26 is closed. Therefore, when the switch 26 is open, substantially no output signal from the amplifier 22 is transferred to the load 28. When the switch 26 is closed, the signal transferred to the load 28, which may, for example, comprise another simulated neuron, jumps for zero to a definite value in an abrupt digital step. Thus, effectively the switch 26 functions as a threshold circuit. A switch actuating circuit 29 is coupled to close the switch 26 at the correct point. The overall input-output characteristic of the simulated neuron 18 is shown by the characteristic 32 in FIGURE 2. The characteristic 32 therefore duplicates the characteristic 10 of FIGURE 1.

In FIGURE 3 another simulated neuron is provided. The neuron 34 includes, in addition to a summing network 36 and an amplifier 38, a negative resistance or regenerative device 40. The negative resistance device 40 is serially connected between the amplifier 38 and a load 42 and is selected to exhibit an S-shaped current-voltage characteristic which includes a dynamic negative resistance region. One negative resistance device which does exhibit such a characteristic is a four layer diode. Such negative resistance devices exhibit both bistable storage and triggering capabilities and thus the negative resistance device 40 performs the same function as the bistable switch 26 and the switch actuating circuit 29 of FIGURE 2. The device 40 exhibits a low output until triggering after which the device 40 exhibits a high output. The triggering to a relatively high output establishes the desired threshold point and abrupt step required in a simulated neuron.

It is to be noted that the switch 26 of FIGURE 2 may also be connected to shunt the output of the amplifier 22 to ground by connecting it in parallel with the amplifier 22. In such a connection the switch is initially closed until the desired threshold point is reached and then opened to provide the abrupt step output. This parallel operation is duplicated in the circuit of FIGURE 3 by including negative resistance device 40 which has an N-shaped current-voltage characteristic including a negative resistance region, such as a tunnel diode, and shunting it across the amplifier 38.

In FIGURE 4 there is illustrated a detailed schematic circuit diagram of another electrical neuron which exhibits the input-output characteristic shown in FIGURE 1. The simulated neuron 50 includes an excitatory input terminal 52 and an inhibitory input terminal 54. Excitatory inputs tend to increase the output of the neuron 50 whereas inhibitory inputs tend to reduce this output. Excitatory inputs are applied to the input terminal 52 through one or more resistors of the resistive network 56 whereas inhibitory inputs are applied to the inhibitory input terminal 54 through a similar resistive network 58. Excitatory inputs from the terminal 52 and inhibitory inputs from the terminal 54 are applied to summing and isolating transistors 60 and 62, respectively. The transistors 60 and 62 which are PNP type transistors include, respectively, emitter electrodes 64 and 66, base electrodes 68 and 70, and collector electrodes 72 and 74. The emitters 64 and 66 are connected directly to the input terminals 52 and 54, respectively, while the base electrodes 68 and 70 are grounded. Diodes 67 and 69 are also connected between ground and the emitters 64 and 66, respectively, and poled to prevent the emitters 64 and 66 from becoming more negative than ground.

Biasing current is applied to the transistor 62 by coupling the emitter 66 thereof through a biasing resistor 82 to the positive terminal 83 of a potential sourve $V_A$. Similarly, biasing current is applied to the transistor 60 by coupling the emitter 64 thereof through the series combination of a resistor 84 and a potentiometer 86 to the positive potential terminal 83 of the power supply $V_A$. The resistor 84 and potentiometer 86 reduce the amount of biasing current flowing into the transistor 60 as compared to the transistor 62 and necessitates a greater input to the transistor 60 than the transistor 62 before an output is produced by the neuron 50. As will be seen, this biasing arrangement effectively provides a threshold point for the electrical neuron 50.

The transistors 60 and 62 are connected in the grounded base configuration to provide a low input impedance for the excitatory and inhibitory input signals. The coupling resistors in the coupling networks 56 and 58 are selected to be substantially larger than the input impedances exhibited by the transistors 60 and 62, respectively. Therefore, the coupling networks 56 and 58 effectively comprise current sources, the output current of which are linearly added by the transistors 60 and 62, respectively. The low input impedances exhibited by the transistors 60 and 62 also prevent input signals from being reflected away from the inputs of the neuron 50 to other neurons. Thus, it is apparent that linear summation as well as isolation is provided in the input to the neuron 50.

The collector electrodes 72 and 74 of the transistors 60 and 62, respectively, are coupled to the anodes of isolating diodes 76 and 78, respectively, while the cathodes of the diodes 76 and 78 are coupled to the separate inputs of a difference amplifier 90. The difference amplifier 90 is a linear amplifier which amplifies the difference between the excitatory and inhibitory inputs after the threshold point of the neuron 50 has been exceeded. The inhibitory inputs tend to reduce the output of the amplifier 90 whereas the excitatory inputs tend to increase this output.

The difference amplifier 90 includes a pair of NPN transistors 92 and 94 which are connected in first and second parallel conductive paths across a current source 96. The first conductive path is formed by connecting the collector 98 of the transistor 92 directly to the terminal 83 of the power supply $V_A$ and connecting the emitter 100 of this transistor through a resistor 102 to one terminal 104 of the current source 96. The second conductive path is formed by connecting the collector 106 of the transistor 94 through a load resistor 108 to the terminal 83 of the power supply $V_A$ and connecting the emitter 110 of this transistor through a resistor 112 to the terminal 104 of the current source 96.

Excitatory input signals are applied from the transistor 60 through the diode 76 to the base 114 of the transistor 92 in the difference amplifier 90. Inhibitory input signals are applied from the transistor 62 through the diode 78 to the base 116 of the transistor 94 in the difference amplifier. The bases 114 and 116 of the transistors 92 and 94, respectively, are coupled through resistors 118 and 120 to the negative potential terminal 122 of a power supply $V_B$. Capacitors 124 and 126 are shunted across resistors 118 and 120 to integrate input signals which arrive time displaced from each other. The capacitors 124 and 126 are required only in those special cases where integration of the input signals is desired.

The current source 96 includes an NPN transistor 128 having a collector 130 coupled directly to the terminal 104 and an emitter 132 coupled through a resistor 134 to the negative potential terminal 136 of a power supply $V_C$. The base 138 of the transistor 128 is coupled to the junction point of a voltage divider 140 including a pair of resistors 142 and 144 serially connected between the power supply terminal 136 and circuit ground.

The output of the difference amplifier 90 is taken from the collector 106 of the transistor 94 and is applied to a two-stage emitter follower amplifier 146 including transistors 148 and 150. A diode 109 is coupled between ground and the collector 106 of the transistor 94 and poled to prevent the collector 106 from becoming negative. The collectors 152 and 154 of the transistors 148 and 150 are coupled through resistors 156 and 158, respectively, to the terminal 83 of the power supply $V_A$ whereas the emitters 160 and 162 are coupled through resistors 164 and 166 to circuit ground. The base 168 of the transistor 148 is coupled to the collector 106 of the transistor 94 while the base 170 of the transistor 150 is coupled to the emitter 160 of the transistor 148. The output of the simulated neuron 50 is derived from an output terminal 172 coupled to the emitter 162 of the emitter follower amplifier 150.

A regenerative and degenerative feedback paths are included in the neuron 50 to couple the output thereof back to the input terminals 52 and 54 so as to provide the digital step increase in the transfer characteristic of FIGURE 1. The regenerative circuit 173 is provided by coupling the output terminal 172 through a resistor 174 back to the excitatory input terminal 52. The degenerative circuit 175 is provided by coupling the output terminal 172 through the serial combination of a resistor 176 and a pair of diodes 178 and 180, connected anode-to-cathode, to the inhibitory input terminal 54 of the threshold circuit 50. As will be seen, the regenerative circuit 173 is a direct acting regenerative circuit whereas the degenerative circuit 175 is a delayed acting degenerative circuit due to the diodes 178 and 180. Thus, excitatory feedback to rapidly increase the output of the neuron 50 is provided immediately upon the production of an output signal. Inhibitory feedback to cancel the excitatory feedback is delayed until the voltage drops of the serially connected diodes are overcome.

In operation, the transistor 128 in the constant current source 96 is fixedly biased to provide a constant current which divides and flows through the two parallel conductive branches of the difference amplifier 90. Quiescently, the current through the transistor 94 causes the collector 106 thereof to be clamped to ground by the diode 109 and no input signal is applied to the emitter-follower amplifiers 148 and 150 and neither of them conducts. Thus, the output terminal 172 of the neuron 50 is at zero or ground potential. The inhibitory input transistor 62 is biased to conduct more biasing current than the excitatory input transistor 60 and the greater current through the inhibitory transistor 62 holds the neuron 50 cut off. The neuron 50 remains cut off until the current flowing into the excitatory input transistor 60 exceeds that flowing into the inhibitory input transistor 62. The amount of current needed to turn on the neuron 50 is designated $I_o$ in FIGURE 1. This threshold current value is established by the potentiometer 86. The threshold current $I_o$ should be set not less than 0.08 milliampere so as to avoid circuit instability. The neuron 50 exhibits no output for low values of excitatory input current, i.e., below the threshold $I_o$, and therefore the region 12 (FIGURE 1) of a biological neuron is reproduced by the simulated neuron 50.

When the excitatory input current to the transistor 60 exceeds the inhibitory input current to the transistor 62 by the threshold value $I_o$, the transistor 92 in the difference amplifier 90 conducts more heavily and therefore steers current from the constant current source 96 away from the transistor 94. The collector 106 of the transistor 94 tends to become more positive than ground potential and therefore applies a forward biasing input signal to the base 168 of the transistor emitter follower amplifier 148. The output signal of the amplifier 148 forward biases the second emitter follower amplifier 150 to conduction and an output signal is produced at the output terminal 172.

The output signal is fed back through the first feedback circuit 173 to the excitatory input terminal 52. More excitatory current is therefore available to produce a greater output which in turn is fed back to the input. This regenerative feedback causes the output voltage to rise substantially vertically. The output is initially prevented from being fed back through the second feedback circuit 175 to increase the inhibitory current because the diodes 178 and 180 permit substantially no increase in current therethrough for increasing but still low values of feedback voltage. Thus, initially only excitatory feedback is permitted. When the output voltage rises to a first value $V_1$ (FIGURE 1), which value is sufficient to overcome the voltage drops across the diodes 178 and 180, an inhibitory current is fed back to the inhibitory input terminal 54. This inhibitory feedback current counterbalances the excitatory feedback current and no further regeneration occurs. The output voltage remains at $V_1$ in the absence of increasing the excitatory input signals. Consequently, the abrupt step exhibited by the characteristic 10 of FIGURE 1 is also provided in the neuron 50. In the absence of the second or inhibitory feedback path 175, the excitatory regenerative feedback would produce the input-output characteristic shown in FIGURE 5. It is to be noted that in this characteristic, the output jumps to the saturation value $V_2$ as soon as an output is produced. In the simulated neuron 50 the regeneration is limited to a jump to an output voltage value of $V_1$ by providing essentially equal and opposite feedback when this output value is produced. The height of the digital step in FIGURE 1 may be increased by increasing the number of diodes in the second feedback path 175 or decreased by decreasing this number. Thus, the neuron 50 is flexible in reproducing the digital step found in biological neuron characteristics.

For further increasing values of excitatory current, the output voltage exhibits an analog increase like the portion 14 of the curve 10 of FIGURE 1. Increasing excitatory input current causes more and more current to steer through the transistor 92 and away from the transistor 94. Thus, the collector 106 of the transistor 94 approaches the biasing voltage value. When substantially no current flows through the transistor 94, the collector 106 exhibits the bias voltage value $V_A$ and no greater output voltage occurs. This saturation voltage value is designated $V_2$ in FIGURE 1. Further increases in excitatory input current do not increase the output voltage above $V_2$ and thus the portion 16 of the curve 10 of FIGURE 1 is simulated. Therefore, the simulated neuron 50 exhibits the same analog increase up to saturation that a biological neuron exhibits. A simulated neuron 50 constructed in accordance with the invention employed the circuit component values shown in FIGURE 4.

In accordance with the invention, an electrical neuron which simulates the major functions of a pulseless biological neuron is provided. The simulated neuron receives excitatory and inhibitory signal input levels of the same polarity and produces an output signal level. The output signal level may be applied to other simulated neurons of the same type and this output signal will function as either an inhibitory signal or an excitatory signal depending upon to which input terminal the signal is applied.

What is claimed is:
1. A threshold circuit, comprising in combination,
    a difference amplifier for amplifying the difference between exciting and inhibiting signals to produce output signals,
    means including exciting signal terminals for applying direct current exciting signals to activate said amplifier to provide said output signals and to increase the amplitude of said output signals,
    means including inhibiting signal terminals for applying direct current inhibiting signals to said amplifier to decrease the amplitude of said output signals,
    means for regeneratively feeding back output signals of said amplifier to said exciting signal terminals to regeneratively increase the amplitude of said output signals of said amplifier to provide a digital step therein, and
    means for feeding back said output signals of said amplifier to said inhibiting signal terminals at a predetermined value of amplitude of said output signals to counterbalance and effectively cancel said regenerative feedback so as to cause said difference amplifier to change from producing a digital step increase in amplitude of said oupt signals to an analog increase in amplitude of said output signals for further increases in exciting signal input.
2. A threshold circuit, comprising in combination,
    a difference amplifier for amplifying the difference between exciting and inhibiting signals and having an output terminal and two conductive paths each with an input terminal,
    means for applying direct current exciting signals to the input terminal of one of said conductive paths to increase the output of said amplifier,
    means for applying direct current inhibiting signals to the input terminal of the other of said conductive paths to decrease the output of said amplifier,
    means for positively feeding back output signals from the output terminal of said amplifier to the input terminal of said one conductive path to regeneratively increase the output of said amplifier to provide a digital step therein, and
    means for cancelling said positive feedback at a predetermined value of output to cause the difference amplifier to change from a digital increase in output to an analog increase in output for increases in exciting input signals.
3. An electrical circuit which simulates a pulseless biological neuron, comprising in combination,
    a difference amplifier for amplifying the difference between direct current excitatory and inhibitory input signals and having an output terminal and two conductive paths each with an input terminal,
    means for applying direct current excitatory signals to said input terminal of one of said conductive paths to increase the amplitude of said output signals derived from said output terminal of said amplifier,
    means for applying direct current inhibitory signals to said input terminal of the other of said conductive paths to decrease the amplitude of said output signals derived from said output terminal of said amplifier,
    means for quiescently biasing said difference amplifier to require the application of excitatory input signals of greater than a predetermined value in order to produce output signals so as to provide a predetermined threshold point for said electrical circuit,
    first means for positively feeding back the output signals from said output terminal of said amplifier to said input terminal of said one conductive path to regeneratively increase the amplitude of the output signals of said amplifier to provide a digital step increase at said predetermined threshold point, and
    second means including a non-linear threshold device coupled to feedback the output signals from said output terminal of said amplifier to said input terminal of said other conductive path when the amplitude of said output signal exceeds said threshold to counterbalance said positive feedback to cancel the effects of said first feedback means to cause the amplifier to change from a digital increase in amplitude of the output signals to an analog increase in amplitude of output signals for further increases in excitatory input signals.
4. An electrical neuron circuit comprising in combination,
    an amplifier for amplifying direct current input signals to provide direct current output signals,
    means for applying direct current excitatory input signals to said amplifier to activate said amplifier to produce said direct current output signals,
    means for applying direct current inhibitory input signals to said amplifier to decrease the amplitude of said output signals by inhibiting the activation of said amplifier,
    means coupled to said amplifier for delaying the production of said output signals until said excitatory input signals exceed said inhibitory input signals by a predetermined amount to provide an input-output transfer characteristic for said electrical neuron circuit that exhibits a predetermined threshold point,
    means coupled to said amplifier for providing in said output signals at said predetermined threshold point a step increase in amplitude to a first value so as to provide a digital step in said input-output transfer characteristic, means including said amplifier for producing a substantially linear increase in amplitude of output signals from said first value to second value for amplitudes of excitatory input signals that are increasingly greater than amplitudes of said inhibitory signals so that said input-output transfer characteristic exhibits a substantially linear analog increase from said first value to said second value, and means for biasing said amplifier to saturate at said second value so that said input-output transfer characteristic exhibits a maximum saturation point at said second value.

5. The neuron circuit in accordance with claim 4 wherein said amplifier comprises a difference amplifier having first and second conduction paths.

6. A neuron circuit in accordance with claim 5 wherein said excitatory input signals are applied to increase the conduction of said first conduction path and said inhibitory input signals are applied to increase the conduction of said second conduction path with said difference amplifier providing the difference between the two input signals in said conduction paths.

7. A neuron circuit in accordance with claim 5 wherein said delayed production of output signals at said predetermined threshold point is caused by biasing said first conduction path further away from conduction than said second conduction path.

8. A neuron circuit in accordance with claim 7 wherein said digital step increase is provided by regeneratively feeding back through a first feedback network said output signals to add to said excitatory input signals applied to said first conduction path.

9. An electrical neuron circuit in accordance with claim 8 wherein said analog increase is caused by feeding back said output signals to said second conduction path through a second feedback network including a threshold device that is rendered conductive when said output signals exceed said first value so as to counterbalance and effectively cancel the feedback through said first feedback network.

10. An electrical neuron circuit in accordance with claim 9 wherein said non-linear threshold device comprises one and more diodes coupled between the output of said neuron circuit and said second conduction path.

References Cited

UNITED STATES PATENTS

| 3,097,349 | 7/1963 | Putzrath et al. | 340—172.5 |
| 3,144,564 | 8/1964 | Sikorra | 307—88.5 |
| 3,166,678 | 1/1965 | Fleshman et al. | 307—88.5 |
| 3,196,415 | 7/1965 | Brain | 340—174 |
| 3,308,441 | 3/1967 | Dusheck | 340—172.5 |

ARTHUR GAUSS, *Primary Examiner.*

S. D. MILLER, *Assistant Examiner.*